UNITED STATES PATENT OFFICE.

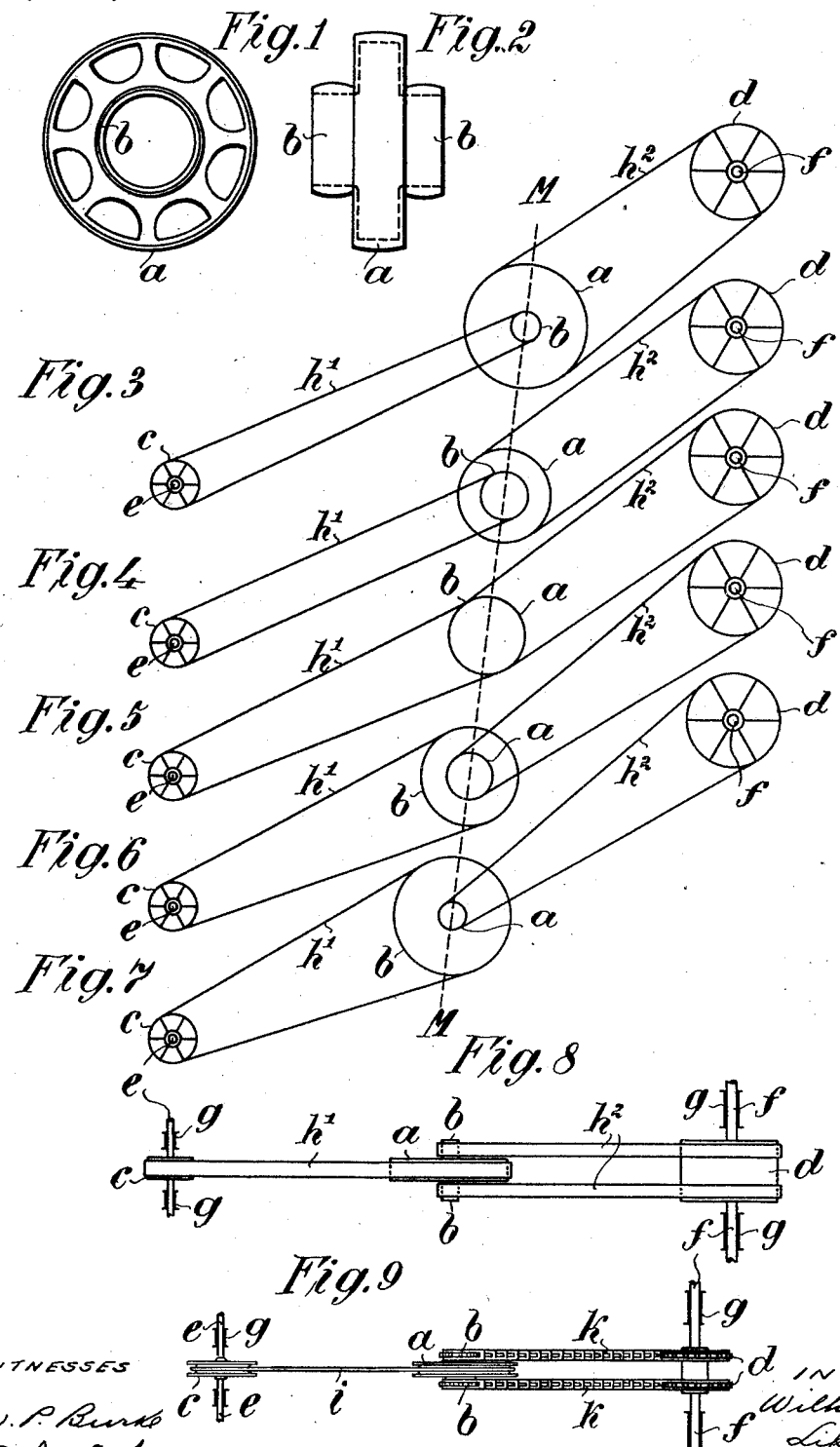
W. LIPPITZ.
GEARING.
APPLICATION FILED AUG. 5, 1910.
1,003,142.
Patented Sept. 12, 1911.

WILHELM LIPPITZ, OF POSEN, GERMANY.

GEARING.

1,003,142.      Specification of Letters Patent.      Patented Sept. 12, 1911.

Application filed August 5, 1910. Serial No. 575,709.

*To all whom it may concern:*

Be it known that I, WILHELM LIPPITZ, citizen of the Empire of Germany, residing at 56/57 Kronprinzenstrasse, Posen, Germany, have invented new and useful Improvements in Gearing, of which the following is a specification.

The subject of the invention consists of a freely suspended rotary element which is to be used in connection with machinery in place of the usual counter-shaft for the purpose of simplifying the application of gearing means and for lessening the cost of installation and maintenance.

The invention and its application are shown for example in the accompanying drawing in which similar reference letters indicate like parts in the various views.

Figure 1 is an elevation, and Fig. 2 a side view of the rotary element which is shown as being formed hollow. Fig. 3 to Fig. 7 inclusive show diagrammatically the application of the device for various ratios of transmission. Fig. 8 is a plan view of Fig. 7, and Fig. 9 shows the application of the device in a combined rope and chain drive.

Referring to Figs. 1 to 8, inclusive, in which the device is shown as adapted to be used in connection with belts, $f$ is the driving and ($e$) the driven shaft, ($d$) the driving and ($c$) the driven pulley, and ($a$) and ($b$) the pulleys of the new rotary transmission element.

The novel feature of the rotary member lies in the fact that it is without shaft and bearings being entirely carried or supported by the driving members ($h^1$), ($h^2$). This dispenses with the unavoidable loss of power resulting from friction in the case of a counter shaft drive, as well as with the costs resulting from the installation of the shaft bearings, and the cost of maintenance thereof.

Another advantage of this invention over the fixed counter shaft drive, is that the rotary element serves at the same time as a self-acting tension pulley. It is suspended in both belts ($h^1$) and ($h^2$) and its weight tensions the belts continuously and equally, which obviates the usual shortening of the pulling members to obtain the required tension.

As the rotary element is applicable anywhere, it is possible to vary the speed ratio in the transmission of motion without the necessity of having also to alter the length of the belts ($h^1$) and ($h^2$), although the diameter of the pulleys ($a$) and ($b$) will be varied. The diameters of the latter will have to be so determined that the sum thereof is equal to that of the pulleys ($c$) and ($d$). The examples shown in Figs. 3, 4, 5, 6 and 7 drawn to scale diagrammatically show various transmission ratios based on the combination: Belt length ($h^1$) = ($h^2$) constant. All the centers of these rotary elements lie in a straight line (M—M).

If desired a number of rotary elements such as described may be employed, and they may be arranged in parallel or in series with one another.

A machine, say a ventilator may be coupled with the rotary element and carried by the driving members without departing from the nature or scope of the invention.

What I claim and desire to secure by Letters Patent of the United States is:

1. In mechanism of the class described, in combination, a driving member, a driven member, a pair of belts operatively associated with said driving member, a belt operatively associated with said driven member and a rotary element supported entirely by said belts and adapted to transmit power from the first to the second thereof.

2. In mechanism of the class described, in combination, a driving member, a driven member, a rotary element interposed between said members and provided with a plurality of pulleys, a pair of belts operatively associated with said driving member and engaging a pair of said pulleys and a belt operatively associated with said driven member and engaging another of said pulleys, said rotary element being supported entirely by said belts.

In testimony whereof I have signed my name to this specification in the presence of two subscribing witnesses.

WILHELM LIPPITZ.

Witnesses:
    SAM. A. KATZ,
    ERNST BLEISCH.

---

Copies of this patent may be obtained for five cents each, by addressing the "Commissioner of Patents, Washington, D. C."